United States Patent
Caringi

[15] 3,658,012
[45] Apr. 25, 1972

[54] IDLER FOR CHANNEL TIEDOWN TRACK

[72] Inventor: Remo N. Caringi, Milford, Mich.
[73] Assignee: Portec, Inc., Chicago, Ill.
[22] Filed: Nov. 27, 1970
[21] Appl. No.: 93,283

[52] U.S. Cl. ....................105/368 T, 105/369 A, 296/1 A
[51] Int. Cl. ..............................B60p 7/08, B65j 1/22
[58] Field of Search............105/368 T, 369 A; 248/361 A; 280/179.1; 296/1 A; 24/230.5

[56] References Cited

UNITED STATES PATENTS

| | | | |
|---|---|---|---|
| 2,205,273 | 6/1940 | Radey | 105/368 T |
| 2,322,576 | 6/1943 | Huebshman | 105/368 T |
| 3,294,354 | 12/1966 | Batey | 105/368 T |
| 3,348,273 | 10/1967 | Hall | 105/368 T |
| 3,566,804 | 3/1971 | Mietla | 105/369 A |

Primary Examiner—Drayton E. Hoffman
Attorney—Barnes, Kissell, Raisch & Choate

[57] ABSTRACT

An idler slidably guiding a hold-down chain or the like running from cargo to a tiedown secured in a channel-type anchorage beam. The idler preferably comprises a rod bent near its center to form two legs, one of which is curved upwardly centrally of the leg to form a raised guide portion for slidably guiding the tiedown chain thereunder. The other leg is curved outwardly concavely relatively to the first leg and is dimensioned relative to the channel track, and the tiedown anchorage holes in the side wall thereof and the one leg so that the idler can be pivoted approximately 85° from a locked to a free position in which it can be slid longitudinally of the track. In all positions of the idler it is captured by the flanges of the channel so that it cannot be lifted out of the track. To lock the idler it is pivoted while the free end of the one leg is being inserted into a selected anchorage hole in one of the channel side walls until the free end of the other leg butts against the one side wall in the space between a pair of adjacent holes, whereupon the bend abuts the opposite side wall of the channel. The forces exerted by the tiedown chain assist in maintaining the idler in locked position.

10 Claims, 4 Drawing Figures

PATENTED APR 25 1972 3,658,012
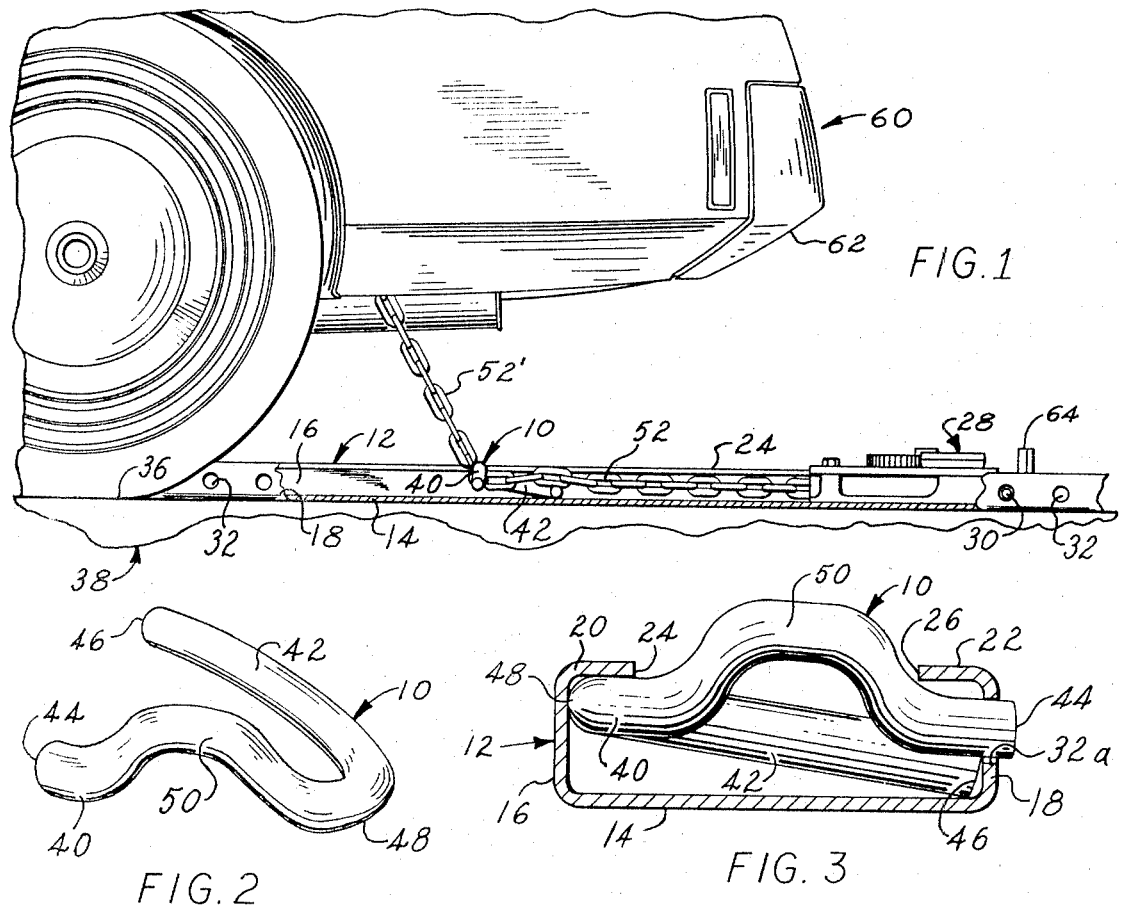
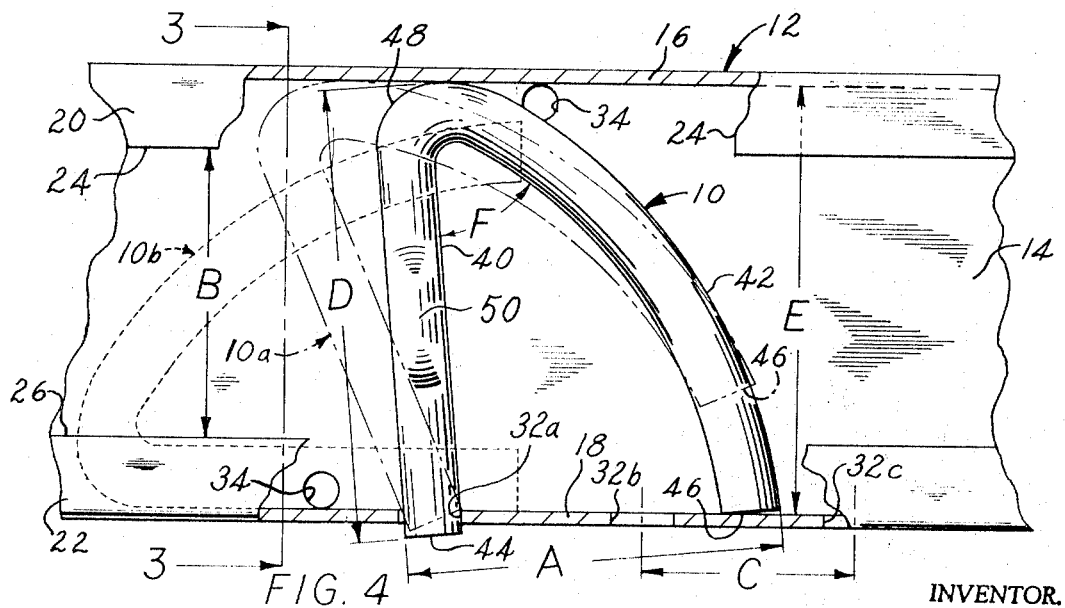
INVENTOR.
REMO N. CARINGI
BY
Barnes, Kisselle, Raisch & Choate
ATTORNEYS

IDLER FOR CHANNEL TIEDOWN TRACK

This invention relates to devices for securing or tying down cargo to a carrier conveyance, and more particularly to a tiedown implement which may be used as a securing point or as a fairlead or idler for slidably guiding a tiedown chain or the like from its point of attachment to the cargo to a tiedown winch.

A large percentage of the automotive vehicles manufactured today are shipped from the point of final assembly to dealers on specially designed multi-level railway or highway carriers. The vehicles are usually loaded on the carrier by being driven onto the carrier under their own power and arranged on each level thereof in tandem relation. In either type of conveyance, it is necessary to provide vehicle tiedown means capable of reliably securing numerous makes and models of vehicles which vary in length, road clearance and weight. In order to provide adjustability lengthwise of the carrier conveyance, anchoring rails are provided which are arranged in pairs adjacent the wheel tracks of the carrier deck to serve as anchoring beams for tiedown structure adjustable lengthwise along such beams.

One type of tiedown beam in common use is the so-called channel track which consists of a channel section having a horizontal bottom wall and a pair of spaced upright side walls each with an inturned flange joined to its upper edge. The juxtaposed inner edges of the flanges are spaced apart to define a slot through which the tiedown chain may extend, the flanges serving to capture tiedown winches received within the confines of the channel. Such tiedowns usually have a movable anchoring bolt slidable transversely of the channel into a selected one of a row of holes provided in one of the side walls of the channel to releasably lock the tiedown against movement longitudinally of the channel.

In tying down automotive vehicles, the tiedown chains are arranged two in front and two at the rear of the vehicle and each lead from an anchorage point on the underbody of the vehicle at a given angle downwardly and away from the center of the vehicle in order to provide the optimum restraint against upward as well as fore and aft movement of the vehicle. However, if the chain is arranged at this angle and extends from an anchoring point on the vehicle underbody located well inboard of the front or rear bumper thereof, the intersection of the chain with the tiedown channel will also be well inboard of the extreme ends of the vehicle, where it is difficult for the loading personnel to get at the tiedown winch. Accordingly, tiedown idlers or fairleads have been provided in addition to the tiedown winches and arranged separate therefrom to provide a guide for leading one run of the chain at a proper angle upwardly from the channel to the vehicle and the other run along and in the channel to a tiedown located remote from the idler out beyond the front or rear of the vehicle, as the case may be, where the tiedown winch can be readily operated without obstruction from the vehicle.

An object of the present invention is to provide a tiedown idler or fairlead particularly adapted for use with the aforementioned channel track which is positive in operation, convenient in use, easily installed in a working position and easily disconnected therefrom, economical of manufacture, extremely simple in structure and of general superiority in service and reliability.

Another object of the present invention is to provide a tiedown implement that is releasably connected to a channel-type cargo rail for ready adjustment along the rail, and which can serve as either an idler in conjunction with an associated tiedown winch or as a tiedown point itself.

Other objects, features and advantages of the present invention will become apparent from the following detailed description taken in junction with the accompanying drawing wherein:

FIG. 1 is a fragmentary side elevational view of a deck of a railway automobile loader car provided with a channel track tiedown beam illustrating the idler of the present invention in use in conjunction with a vehicle and associated windlass chain mechanism.

FIG. 2 is a perspective view on an enlarged scale showing the idler of the invention by itself.

FIG. 3 is a vertical sectional view taken on the line 3—3 of FIG. 4.

FIG. 4 is a fragmentary top plan view of the channel track with the idler shown therein in various positions, portions of the track being broken away to better illustrate detail.

Referring in more detail to the accompanying drawing, FIGS. 1–4 illustrate a preferred but exemplary form of a tiedown idler 10 constructed in accordance with the present invention which is particularly adapted for use with a commercial tiedown track in the form of a channel 12 well known in the art. Channel 12 has a flat bottom wall 14, a pair of laterally spaced upright parallel side walls 16 and 18 and a pair of inturned horizontal flanges 20 and 22 joined respectively to the upper edges of walls 16 and 18. A conventional or known windlass tiedown unit 28 is received in channel 12 and flanges 20 and 22 in conjunction with the associated side walls 16 and 18 slidably embrace tiedown 28 to restrain movement thereof in all directions except longitudinally of channel 12. Tiedown 28 is releasably secured against longitudinal movement relative to channel 12 by a transversely slidable bolt 30 which is adapted to be selectively inserted in any one of a row of holes 32 provided at equally spaced intervals in wall 18 of channel 12. Conventionally, such holes 32 are seven-eighths of an inch in diameter and are spaced on 3-inch centers. For further purposes of illustration and not by way of limitation, one standard tiedown track channel 12 is made from 3/16-inch thick sheet steel and has an outside transverse dimension of 6¼ inch, flange edges 24 and 26 are spaced apart by a dimension B of 4 inch, walls 16 and 18 are spaced apart by an interior dimension E of 5⅞ inch, and channel 12 has a vertical outside dimension of 2 inches.

Suitable bolt or welding holes 34 (FIG. 4) may be provided in the bottom wall 14 for facilitating securement of channel 12 to the vehicle receiving deck 36 (FIG. 1) of a carrier 38. Two such channels 12 extend longitudinally of deck 36, preferably just inboard of the wheel tracks of the deck and running the length of each deck of the carrier. Channels 12 are normally left open at their ends for endwise insertion of tiedown windlass 28, which is also the manner in which idler 10 of the present invention is installed into the channel.

Idler 10 preferably is formed from a single length of straight steel cylindrical rod or bar stock which, for example, may be about 13¼ inches long and thirteen-sixteenths of an inch in diameter when constructed for use with a channel 12 dimensioned as set forth previously herein. This length of bar stock is bent near its center into a lopsided U-shape somewhat resembling a boomerang, as best seen in FIGS. 2, 3 and 4 (which are drawn to scale to facilitate construction of a working embodiment of the invention). When so formed, idler 10 has a first leg 40 and a second leg 42 joined at an acute angle F (FIG. 4) of approximately 45°. The outside dimension A of idler 10 (FIG. 4) measured from the remote or outer side of the free end 44 of leg 40 to the outer side of the free end 46 of leg 42 is preferably 55/16 inches in the example presently under consideration. The dimension D (FIG. 4) measured from the end surface of free end 44 parallel to the longitudinal axis of leg 40 to the junction 48 of legs 40 and 42 is in this example 6¼ inches, wherein the center line hole spacing dimension C of holes 32 in channel 12 is 3 inches.

As best seen in FIGS. 2 and 3, leg 40 is bent upwardly in a plane normal to wall 14, assuming idler 10 is resting on wall 14, to form an arch 50 adapted to slidably guide a hold-down chain 52 thereunder as best seen in FIG. 1. By way of example, leg 40 may be upwardly bent so that the total vertical dimension of idler measured in a plane normal to wall 14 is about 2 inches. This will then leave a space beneath arch 50 when idler 10 is resting on wall 14 of approximately 1 3/16 inches in height, which provides adequate clearance for a conventional automotive tiedown chain to be pulled therethrough.

As best seen in FIG. 4, the longer leg 42 of idler 10 is preferably curved concavely relatively to leg 40 throughout its length from junction 48 to its free end 46 in a smooth curve so that the leg lies in a plane perpendicular to the plane in which leg 40 is curved. The radius of the curvature of leg 42 is in the example given about 6¾ inches. However, leg 42 may be made straight instead of curved, but in either case the triangular shape of idler 10 provides clearance for pivoting idler 10 between its locked position shown in solid lines in FIG. 4 through an intermediate position 10a illustrated in dot-dash lines in FIG. 4 to a fully unlocked position 10b illustrated in dotted lines in FIG. 4 wherein idler 10 is free to be slid along within channel 12 in either direction longitudinally thereof.

In the case of a channel track 12 having a row of anchoring holes 32 formed in each of the side walls 16 and 18 (this type not being shown) the rear tiedown idler 10 is inserted into either of the open ends of channel 12 with the idler oriented for endwise bodily movement as in position 10b, this being the proper orientation of idler 10 when it is to be used as the fairlead for the tiedown chain to be secured to the right hand or rear end of a vehicle 60 positioned on deck 36 as shown in FIG. 1. Conversely, if idler 10 is to be used in conjunction with tiedown of the left hand end (not shown) of the vehicle 60 as oriented in FIG. 1, idler 10 is inserted into the end of channel 12 with an orientation turned 180° from position 10b shown in FIG. 4. On the other hand, if channel 12 has only holes 32 in one side of wall 18, as illustrated herein, then a modified idler 10 is provided (not shown) which is a mirror image of idler 10, i.e., as though arch 50 of leg 40 were struck in the opposite direction from that shown herein and then the modified idler inverted so that the arch is uppermost. Then idler 10 shown herein and its mirror image modification are used in pairs, idler 10 being used at the right hand of the vehicle and the modified mirror image idler being used at the left hand of the vehicle as viewed in FIG. 1. With either type of channel, oppositely oriented idlers 10 are inserted in pairs into an open end of track 12 and slid along in the track on the upper surface of the bottom wall 14 until the idlers are approximately located for use beneath the front and rear ends respectively of each vehicle to be spotted on the carrier deck.

Referring to FIGS. 1 and 4, when it is desired to tie down a vehicle 60 on deck 36, a tiedown winch 28 is positioned in channel 12 horizontally beyond the rear bumper 62 of vehicle 60 and its locking bolt 30 is slid sideways by manipulating finger 64 to insert the end of bolt 30 into a selected one of the holes 32, thereby locking tiedown winch 28 against movement longitudinally of channel 12. Then tiedown chain 52 is fully paid out from winch 28 and threaded through the associated idler 10 so that the chain extends over leg 42 and under leg 40 as indicated in FIG. 1. Idler 10 is oriented at this time in a position between positions 10b and 10a shown in FIG. 4, wherein free end 44 and leg 42 still have clearance with the respectively adjacent walls 18 and 16 of channel 12. Hence idler 10 is still free for sliding movement back and forth longitudinally of channel 12. With the chain still loose, idler 10 is positioned longitudinally in channel 12 at the proper spot relative to the underbody anchorage point on vehicle 60 to provide about a 45° lead angle for the run 52' of chain 52 extending from idler 10 up to the anchorage point.

Then, assuming that hole 32a shown in FIG. 4 is the proper location for leg 40 of idler 10, the free end 44 of leg 40 is brought into registry with hole 32a with leg 40 angled at about 45° to wall 18. Idler 10 is then pivoted clockwise while at the same time being moved longitudinally of leg 40 to thereby insert end 44 into hole 32a as the idler is pivoted, as indicated by the progression from the starting position 10a to the locked position of idler 10 shown in solid lines in FIG. 4. As the curved outer surface of leg 42 comes into sliding contact with wall 16 during this pivotal movement, it will tend to cam idler 10 sideways to further insert free end 44 into hole 32a. When idler 10 reaches the locked position shown in solid lines in FIG. 4, leg 40 is disposed with its longitudinal axis at an angle of about 85° with wall 18, the free end 46 of leg 42 will butt against wall 18 in the space between two adjacent holes 32b and 32c, and the junction or bend 48 will butt against wall 16.

The abutment of end 46 and bend 48 against the opposite side walls 18 and 16 plus the engagement of free end 44 with hole 32a will prevent further pivotal movement of idler 10 in the clockwise direction and will securely lock idler 10 in this position so long as there is any force tending to move it toward the right (as viewed in FIG. 4) and/or to pivot it in a clockwise direction. Such a locking force will be exerted on idler 10 by chain 52 after its free end is fed up to the anchorage point on the underbody of vehicle 60, secured thereto and then the chain pulled taut by rotating the windlass drum of tiedown 28 until vehicle 60 is pulled down on its springs. Chain 52 is then locked against payout by the conventional pawl and ratchet mechanism of winch 28. Chain 52 will not exert a pull on leg 40 tending to lift idler 10 and pull it to the right as viewed in FIG. 1. Idler 10 will thus be lifted to the position shown in FIGS. 1 and 3 wherein bend 48 butts the underside of flange 20 and the free end 44 of leg 40 is pulled up against the upper portion of hole 32a, thereby restraining further upward movement of idler 10.

The above tiedown procedure is repeated with respect to the other three tiedowns and idlers provided for tying down vehicle 60.

When it is desired to release vehicle 60, each winch 28 is released to slack off and pay out its chain 52, the chain sliding under arch 50 of leg 40 as it is paid out. Once the chain has been slacked off to disconnect it from the vehicle, idler 10 is free of the forces exerted by the chain and thus can be pivoted counterclockwise as viewed in FIG. 4, thereby reversing the locking procedure and thus moving idler 10 to the unlocked position 10b shown in FIG. 4. In this position idler 10 is free to be slid longitudinally of channel 12 as desired when positioning the tiedown chain for the next vehicle to be shipped on the carrier.

From the foregoing description, it will now be apparent that the present invention provides a tiedown element which can be used alone with a shackle or similar securing device to secure a chain to a channel-type track or in conjunction with a tiedown winch as illustrated herein as an adjustable chain guide or fairlead. The tiedown idler 10 of the present invention is extremely simple and economical in construction and is of high strength because it may be readily made from standard cold rolled or drawn steel rod or bar stocks. However, it is to be understood that the invention may take other forms without departing from the spirit and scope of the invention, such as a stamping made from sheet metal or plate stock or a casting having the outer configuration of legs 40 and 42, with a suitable projection to serve the function of the free end 44 of leg 40. Also, if desired, the space between legs 40 and 42 may be filled in by a web of material, as will be readily understood to those skilled in the art from the foregoing description.

It is also to be understood that channel 12 can be mounted against a side wall or a ceiling of a cargo carrier in which event base wall 14 of channel 12 becomes a "side" wall or "top" wall respectively. Hence the vertical orientation terms such as "bottom," "side," "upper" and "under" are used herein and in the appended claims merely as words of description and not by way of limitation.

I claim:

1. A tiedown element for coupling a hold-down chain or the like from a cargo anchorage to an anchorage channel having a bottom wall, a pair of parallel upright side walls each with an inturned flange at its upper edge and a row of spaced tiedown anchor holes extending lengthwise of said beam in at least one of the side walls, said tiedown element comprising a member having first and second sides forming at an acute angle at a junction thereof and respectively having first and second free ends remote from said junction spaced to provide an outside dimension A across said free ends greater than the spacing B between the juxtaposed inner edges of the channel flanges and less than the interior spacing E between the side walls, the dimension D of said first side from said first free end to said junction being slightly greater than the dimension E, said first free end being adapted for insertion in one of the holes in the one side wall of the channel, said second free end being adapted to abut the one side wall between the holes therein when said member is positioned with said first free end inserted in said one hole and said junction abutting the other side wall of the channel, and means on said member for operably coupling the hold-down chain to said channel.

2. The tiedown element as set forth in claim 1 wherein said second side is curved concavely relative to said first side from said second free end to said junction.

3. The tiedown element as set forth in claim 2 wherein chain coupling means on said member comprises an arch portion curved upwardly along said first side with an opening thereunder for receiving therethrough and guiding thereunder the tiedown chain.

4. The tiedown element as set forth in claim 3 wherein said member comprises a one-piece narrow length of metal bent at said junction to form first and second legs, defining said first and second sides respectively, said arch portion being formed in said first leg.

5. The tiedown element as set forth in claim 4 wherein said length of metal comprises a cylindrical rod having a diameter just slightly smaller than that of the holes in the one side wall of the channel.

6. In combination, a tiedown channel for coupling a hold-down chain or the like from a cargo anchorage to a cargo carrier, said channel having a base wall, a pair of parallel side walls each with an inturned flange at its edge remote from said base wall and a row of spaced tiedown anchor holes extending lengthwise of said channel in at least one of the side walls, and a tiedown element comprising a member having first and second sides forming an acute angle at a junction thereof and respectively having first and second free ends remote from said junction spaced to provide an outside dimension A across said free ends greater than the spacing B between the juxtaposed inner edges of said channel flanges and less than the interior spacing E between said side walls, the dimension D of said first side from said first free end to said junction being slightly greater than the dimension E, said first free end being adapted for insertion in one of the holes in said one side wall of said channel, said second free end being adapted to abut the one side wall between the holes therein when said member is positioned with said first free end inserted in said one hole and said junction abutting said other side wall of the channel, said member having means for operably coupling the hold-down chain to said channel.

7. The combination as set forth in claim 6 wherein said second side of said tiedown element is curved concavely relative to said first side from said second free end to said junction.

8. The combination as set forth in claim 7 wherein chain coupling means of said member comprises an arch portion curved away from said base wall of said channel along said first side to define an opening for receiving therethrough and slidably guiding the tiedown chain.

9. The combination as set forth in claim 8 wherein said member comprises a one-piece narrow length of metal bent at said junction to form first and second legs and defining said first and second sides respectively, said arch portion being formed in said first leg.

10. The combination as set forth in claim 9 wherein said length of metal comprises a cylindrical rod having a diameter just slightly smaller than that of the holes in said one side wall of said channel.

* * * * *